(12) United States Patent
Marmon et al.

(10) Patent No.: US 11,556,714 B2
(45) Date of Patent: Jan. 17, 2023

(54) MULTI-LANGUAGE GROUPING OF CONTENT ITEMS BASED ON SEMANTICALLY EQUIVALENT TOPICS

(71) Applicant: Apple Inc., Cupertino, CA (US)

(72) Inventors: Steve E. Marmon, Mountain View, CA (US); Collin D. Ruffenach, Portland, OR (US); Anil A. Sewani, Sunnyvale, CA (US); Gurumurthy D. Ramkumar, Palo Alto, CA (US); Dominic J. Hughes, Menlo Park, CA (US); Pushkaraj Bhirud, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 224 days.

(21) Appl. No.: 16/818,894

(22) Filed: Mar. 13, 2020

(65) Prior Publication Data

US 2020/0302121 A1    Sep. 24, 2020

Related U.S. Application Data

(60) Provisional application No. 62/822,638, filed on Mar. 22, 2019.

(51) Int. Cl.
| | | |
|---|---|---|
| *G06F 40/30* | (2020.01) | |
| *G06F 40/263* | (2020.01) | |
| *G06F 40/58* | (2020.01) | |
| *G06Q 50/00* | (2012.01) | |

(52) U.S. Cl.
CPC .......... *G06F 40/30* (2020.01); *G06F 40/263* (2020.01); *G06F 40/58* (2020.01); *G06Q 50/01* (2013.01)

(58) Field of Classification Search
None
See application file for complete search history.

(56) References Cited

U.S. PATENT DOCUMENTS

| | | | |
|---|---|---|---|
| 10,599,693 B2* | 3/2020 | Sun | G06F 16/334 |
| 2004/0078809 A1 | 4/2004 | Drazin | |
| 2007/0022134 A1 | 1/2007 | Zhou et al. | |
| 2007/0250468 A1* | 10/2007 | Pieper | G06F 16/9535 |
| 2012/0303561 A1 | 11/2012 | Sathish | |
| 2014/0122055 A1 | 5/2014 | Hobson | |

(Continued)

*Primary Examiner* — Quynh H Nguyen
(74) *Attorney, Agent, or Firm* — Invoke

(57) ABSTRACT

In some implementations, a computing device can present a multi-language grouping of topics. For example, the computing device can determine a primary and secondary language for a user of the computing device. The computing device can request configuration that includes a tag language mapping that can be used to translate topic tags corresponding to the secondary language to topic tags corresponding to the primary language. When the computing device receives tagged content items associated with the secondary language, the computing device can translate the secondary language tags corresponding to the tagged content items into semantically equivalent topic tags in the primary language. The computing device can then group primary language content items and secondary language content items into multi-language groupings based on the topics corresponding to the translated content item tags. The computing device can then present the multi-language topic groupings of content items.

21 Claims, 5 Drawing Sheets

(56) References Cited

U.S. PATENT DOCUMENTS

| | | |
|---|---|---|
| 2015/0339381 A1 | 11/2015 | Jain et al. |
| 2015/0381682 A1 | 12/2015 | Rao et al. |
| 2017/0279905 A1 | 9/2017 | Shah et al. |
| 2018/0330000 A1 | 11/2018 | Noble et al. |

\* cited by examiner

US 11,556,714 B2

MULTI-LANGUAGE GROUPING OF CONTENT ITEMS BASED ON SEMANTICALLY EQUIVALENT TOPICS

RELATED APPLICATIONS

This application claims the benefit of the filing date of U.S. Provisional Patent Application No. 62/822,638 filed on Mar. 22, 2019, which is hereby incorporated by reference.

TECHNICAL FIELD

The disclosure generally relates to multi-language support for graphical user interfaces.

BACKGROUND

Content delivery systems often generate and store topic tags in metadata for content items that identify the subject matter (e.g., topics) of the content of the content items. The topic tags are typically words (e.g., sports, politics, entertainment, etc.) that are in the same language as the content items. Thus, a politics related content item in the French language may be tagged with the topic tag "politique" while a politics related content item in the English language may be tagged with the topic tag "politics." Because the "politique" tag and the "politics" are different tags, client devices (e.g., user devices) that group content items by topic tag for presentation may group the content items tagged "politique" separately from the content items tagged "politics" even though "politique" and "politics" are semantically equivalent.

SUMMARY

In some implementations, a computing device can present a multi-language grouping of topics. For example, the computing device can determine a primary and secondary language for a user of the computing device. The computing device can request configuration that includes a tag language mapping that can be used to translate topic tags corresponding to the secondary language to topic tags corresponding to the primary language. When the computing device receives tagged content items associated with the secondary language, the computing device can translate the secondary language tags corresponding to the tagged content items into semantically equivalent topic tags in the primary language. The computing device can then group primary language content items and secondary language content items into multi-language groupings based on the topics corresponding to the translated content item tags. The computing device can then present the multi-language topic groupings of content items.

Particular implementations provide at least the following advantages. The user experience of a user who consumes content in multiple languages can be improved by grouping content items associated with semantically equivalent topics into a single topic grouping. The user can more efficiently locate and consume all content items associated with a single topic, albeit in different languages, in a single location.

Details of one or more implementations are set forth in the accompanying drawings and the description below. Other features, aspects, and potential advantages will be apparent from the description and drawings, and from the claims.

DESCRIPTION OF DRAWINGS

Like reference symbols in the various drawings indicate like elements.

DETAILED DESCRIPTION

Figure 1:
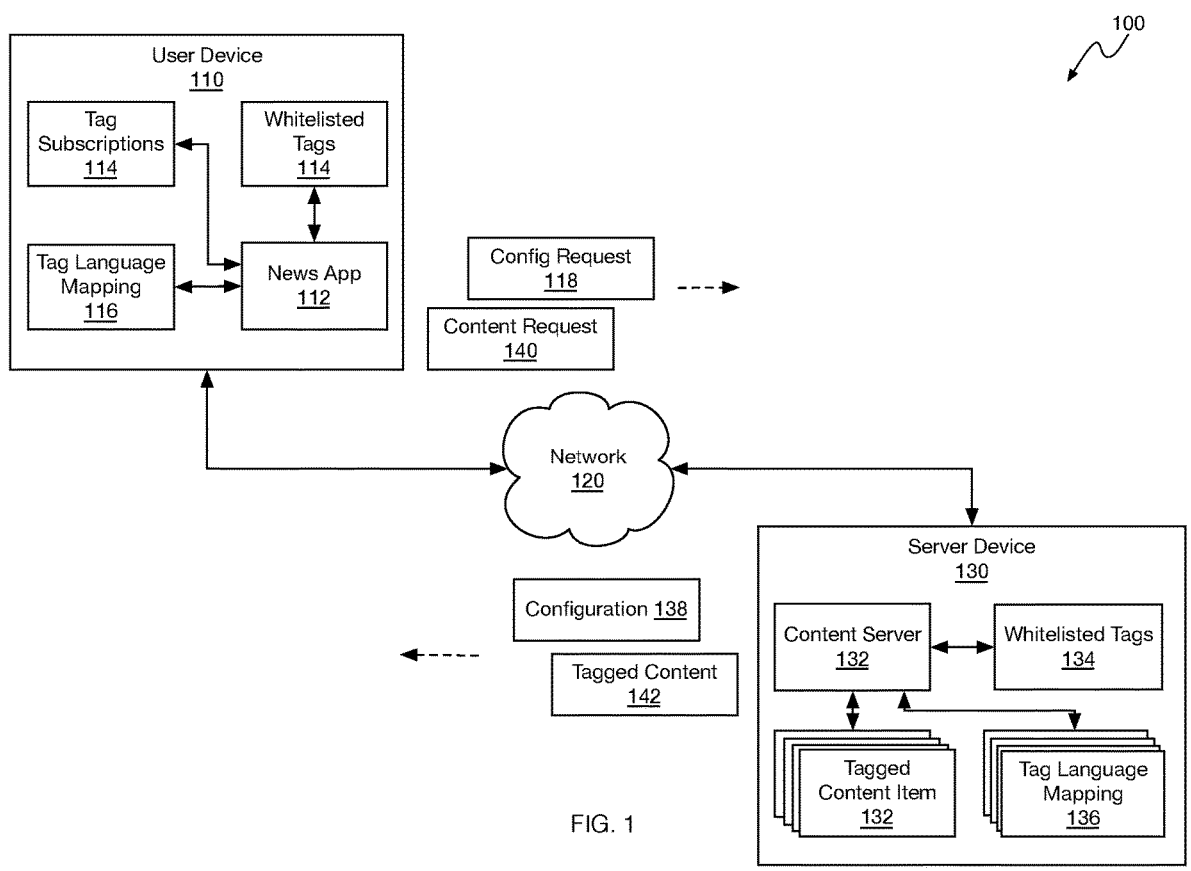
FIG. 1 is a block diagram of an example system for multi-language grouping of content items based on semantically equivalent topic tags.

FIG. 1 is a block diagram of an example system 100 for multi-language grouping of content items based on semantically equivalent topic tags. For example, system 100 can be configured to translate a topic tag associated with a secondary language into a semantically equivalent topic tag associated with a primary language so that content items associated with two or more different languages can be grouped according to semantic similarity.

In some implementations, system 100 can include user device 110. For example, user device 110 can be a computing device, such as a smartphone, tablet computer, smartwatch, laptop computer, desktop computer, in-car infotainment system, or any other computing device.

In some implementations, user device 110 can include news application 112. For example, news application 112 can be a software application installed and/or running on user device 110 that can request and receive various content items (e.g., news articles, videos, opinion pieces, blogs, etc.) from a content server (e.g., content server 132 on server device 130).

In some implementations, user device 110 can include whitelisted topic tags 114. For example, whitelisted tags 114 can include topic tags to which user device 110 can automatically subscribe the user of user device 110. For example, user device 110 can automatically subscribe a user to topics (e.g., tags) identified in whitelisted tags 114 based on the user's content consumption behavior. For example, if the user regularly consumes sports related content but has not provided explicit input to subscribe to the sports topic, then user device 110 may automatically subscribe the user to the sports topic tag. User device 110 cannot subscribe a user to topics corresponding to topic tags that are not included in whitelisted tags 114. User device 110 can obtain whitelisted tags 114 from content server 132 on server device 130 in response to a request for configuration, as described further below.

In some implementations, user device 110 can include tag language mapping 116. For example, tag language mapping can be a data object or file that defines how to translate a tag corresponding to a secondary language into a semantically equivalent tag corresponding to a primary language. If the user of user device 110 has multiple secondary languages, then user device 110 may store multiple tag language mapping files (e.g., one for each secondary language). User device 110 can obtain tag language mapping 116 from content server 132 on server device 130 in response to a request for configuration, as described further below.

To configure news application 112 to process content items from the content server, news application 112 can send a configuration request 118 to content server 132 on server device 130 through network 120. For example, configuration request 118 can include, among other things, language preferences (e.g., primary language, secondary language) associated with user device 110. For example, configuration request 118 can include information identifying the primary language of the user of user device 110. The primary language (e.g., French, English, Chinese, etc.) can, for example, correspond to a language setting of user device 110 that specifies which language should be used to present information on the various graphical user interfaces of user device 110.

The secondary language (e.g., French, English, Chinese, etc.) can be implied by user device 110 based on the user's historical content consumption behavior. For example, if the user's primary language is French, but the user also consumes English content items, then user device 110 can determine that the user's secondary language is English. In some implementations, user device 110 can determine multiple secondary languages for the user. For example, if the user's primary language French, but the user also consumes English and German content items, then user device 110 can determine the user's secondary languages to be English and German. News application 112 can include the user's primary language and all secondary languages in configuration request 118.

In some implementations, system 100 can include server device 130. For example, server device 130 can be a networked computing device. Server device 130 can include content server 132. For example, content server 132 can be a software server that serves configuration and/or content to news applications (e.g., news application 112) on client devices (e.g., user device 110). For example, in response to receiving configuration request 118 from user device 110 through network 120 content server 130 can select a tag language mapping 136 (e.g., configured similarly to tag language mapping 116) for each secondary language identified in configuration request 118. For example, each selected tag language mapping 136 will define how to translate tags of a corresponding secondary language into tags corresponding to the primary language. Thus, if configuration request 118 identifies French as the primary language and identifies English and German as the secondary language, content server 132 can select a first tag language mapping 136 that maps English tags to semantically equivalent French tags and a second tag language mapping 136 that maps German tags to semantically equivalent French tags. For simplicity, the description that follows will use French as the primary language and a single secondary language, English. Thus, in response to receiving configuration request 118 that identifies French as the primary language and English as the secondary language, content server 132 can select a tag language mapping 136 that maps English topic tags to semantically equivalent French topic tags.

In some implementations, content server 132 can send configuration 138 to news application 112 on user device 110 in response to configuration request 118. For example, configuration 138 can include, among other things, the selected tag language mapping 136 and whitelisted tags 134. Upon receipt of configuration 138, user device can store the selected tag language mapping 136 and whitelisted tags 134 as tag language mapping 116 and whitelisted tags 114, respectively.

In some implementations, user device 110 can include tag subscriptions 114. Tag subscriptions 114 can include topic tags to which a user has explicitly subscribed. For example, a user of user device 110 can provide user input that explicitly indicates that the user wishes to subscribe to a particular topic or topics. In response to this explicit subscription input, news application 112 can store topic tags corresponding to the user identified topics in tag subscriptions 114. Tag subscriptions 114 can include topic tags to which a user has been automatically subscribed by user device 110 and/or news application 112. For example, a user of user device 110 can provide user input that can be used by user device 110 and/or news application 112 to imply an interest in a particular topic or topics. For example, the user's historical content consumption behavior can include a pattern that indicates that the user enjoys consuming sports related content, or more specifically, basketball related content. When this pattern is detected by news application 112 and/or user device 110, news application 112 can automatically subscribe the user to the sports topic and/or basketball topic, if these topics are included in whitelisted tags 114, and store the topic tags corresponding to these topics in tag subscriptions 114.

In some implementations, news application 112 can send content request 140 to content server 132. For example, content request 140 can be a request for content items associated with tag subscriptions 114. Thus, news application 112 can include one or more of the topic tags identified in tag subscriptions 114 in content request 140 when sending content request 140 to content server 132.

In some implementations, server device 130 can include tagged content items 132. For example, tagged content items 132 can include content items that have been tagged with topic tags that represent the subject matter of each content item. The topic tags can, for example, be stored in metadata for the corresponding content item.

In some implementations, content server 132 can send tagged content 142 to news application 112. For example, in response to receiving content request 140 identifying the topic tags to which the user of user device 110 has subscribed, content server 132 can select content items from tagged content items 132 that include one or more of the topic tags included in content request 140. For example, since the user consumes content associated with two different languages (e.g., French and English), the topic tags including in content request 140 may include French topic tags and English topic tags. Moreover, content request 140 may include French and English topic tags that are semantically equivalent (e.g., French "politique" is semantically equivalent to English "politics"). Thus, content server 132 may select French and English content items that are related to politics. After selecting the content items based on the topic tags included in content request 140, content server 132 can send the selected tagged content items to news application 112 in tagged content 142.

In response to receiving tagged content 142, news application 112 can group the content items in tagged content 142 by topic tag and present the content item groupings on a display of user device 110, as described below.

Figure 2:
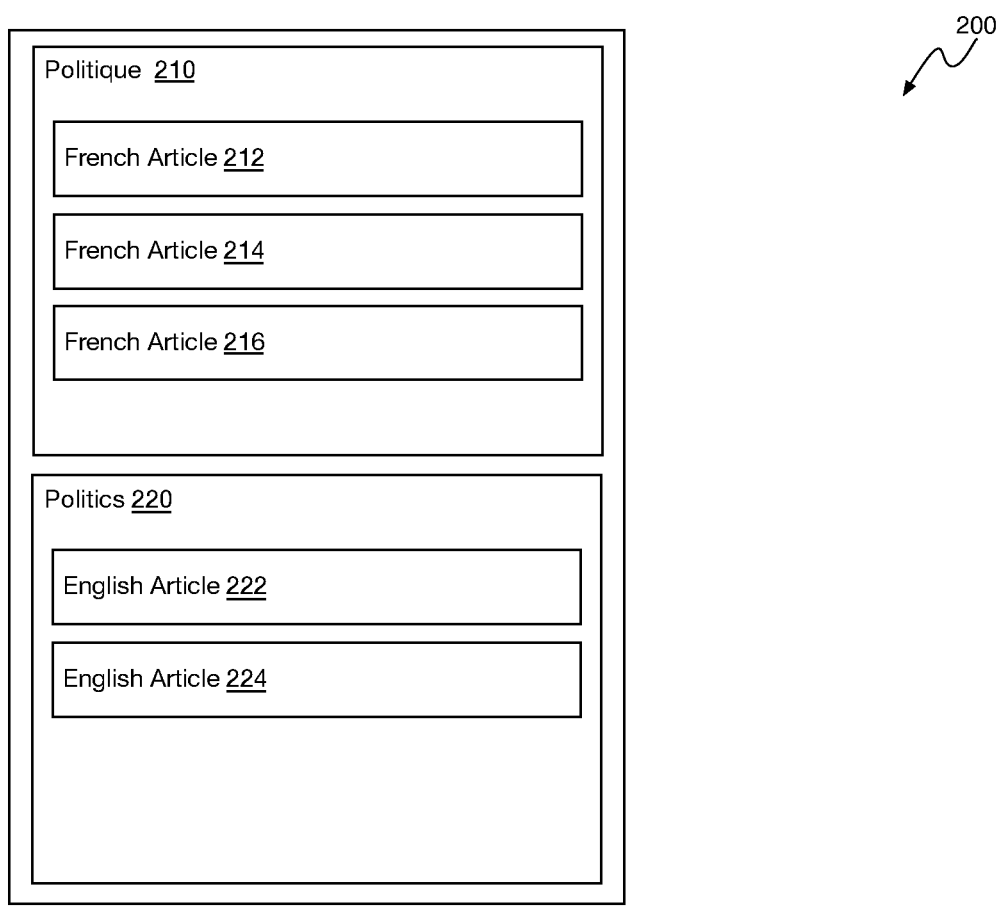
FIG. 2 illustrates an example graphical user interface for presenting content items grouped by topic tag.

FIG. 2 illustrates an example graphical user interface 200 for presenting content items grouped by topic tag. For example, GUI 200 can be generated by news application 112 on user device 110. GUI 200 illustrates how content items (e.g., news articles, opinion pieces, etc.) associated with different languages may be presented when news application 112 does not group content items based on semantic equivalences. For example, news application 112 can generate GUI 200 without translating secondary language topic tags into corresponding primary language topic tags.

As illustrated by GUI 200, the user of user device 200 has subscribed to the French topic "politique" and the English topic "politics". Since, in this embodiment, news application 112 is not grouping based on semantic similarity, news application 112 will group the content items associated with each topic strictly based on the topic tags. Since the French topic tag "politique" is different than the English topic tag "politics", news application 112 will generate two different topic groupings 210 ("politique") and 220 ("politics") for these topic tags even though the topics are semantically similar. Thus, French content items 212, 214, and 216 related to politics (e.g., "politique") will be presented separately from English content items 222, and 224 related to politics (e.g., "politics") even though both the French 212, 214, and 216 and the English content items 222, and 224 are related by content and/or topic.

Unfortunately, the arrangement and presentation of content illustrated by GUI 200 may be confusing to the user who may be expecting all politics related content items to be grouped and presented together. Especially if the "politics" content group is separated from the "politique" content group by other content/topics groupings. To prevent this confusion and make it easier for the user to find content in which the user is interested, news application 112 may group content items by determining semantically equivalent topic tags and grouping content items based on semantically equivalent topics instead of a strict grouping by topic tag.

Figure 3:
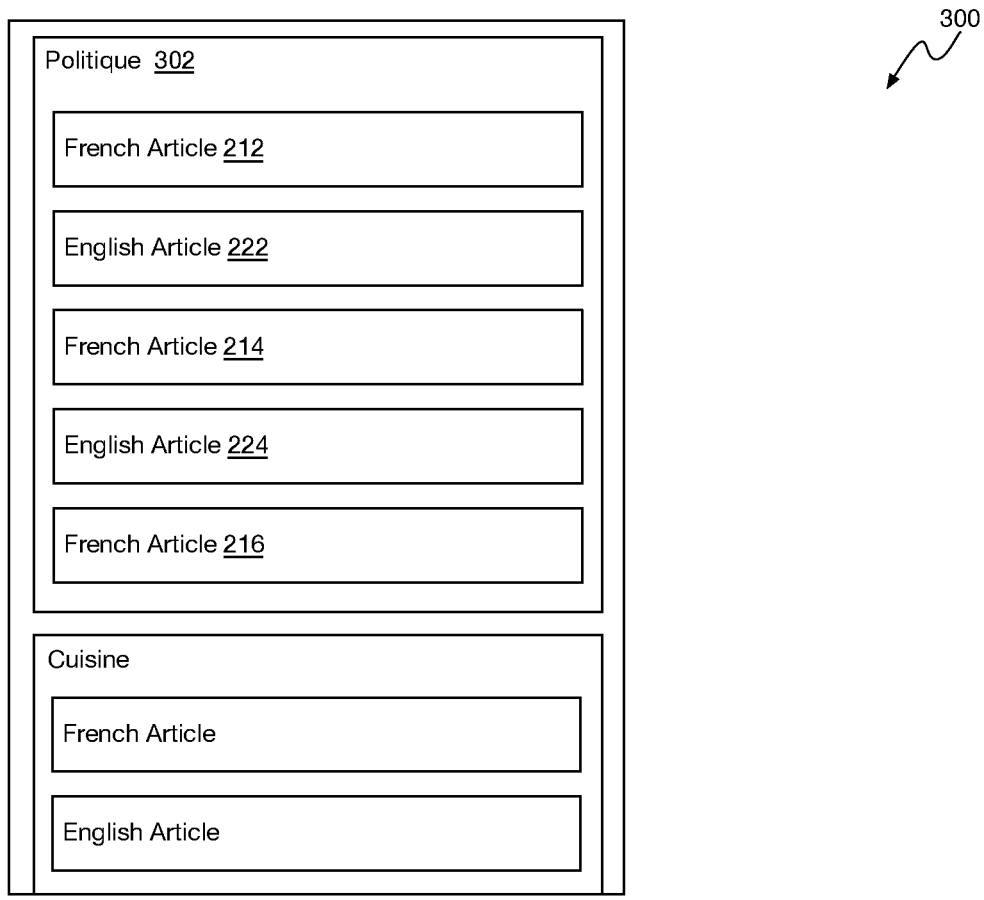
FIG. 3 illustrates an example graphical user interface for presenting a multi-language grouping of content items based on semantically equivalent topic tags.

FIG. 3 illustrates an example graphical user interface 300 for presenting a multi-language grouping of content items based on semantically equivalent topic tags. For example, GUI 300 can be generated by news application 112 on user device 110. GUI 300 illustrates how content items (e.g., news articles, opinion pieces, etc.) associated with different languages may be presented in the same topic grouping when news application 112 is configured to group content items based on semantically equivalent topic tags. For example, news application 112 can generate GUI 300 by translating secondary language topic tags into corresponding primary language topic tags using a tag language mapping 116 that maps English topic tags to semantically equivalent French topic tags, as described above.

As described above, news application 112 can receive French language content items tagged with French language topic tags (e.g., "politique") and English language content items tagged with English language topic tags (e.g., "politics"). Since news application 112 is configured to group content items by topic tag, news application 112 can be configured to translate secondary language tags into corresponding primary language tags before grouping the content items using the secondary language tag to primary language tag mappings in tag language mapping 116 stored on user device 110. For example, before grouping content items for presentation on GUI 300, news application 112 can determine that content items 222 and 224 are associated with the secondary language English and translate the English language "politics" tag associated with content items 222 and 224 into the corresponding (e.g., semantically equivalent) primary language (e.g., French) topic tag "politique" based on the mapping between "politics" and "politique" found in tag language mapping 116. After translating the English "politics" into the French "politique," news application 112 can group the English and French content items 212, 214, 216, 222, and 224 in the same content grouping 302 based on the French "politique" topic tag now associated with each of the content items 212, 214, 216, 222, and 224, as illustrated by FIG. 3.

Example Processes

To enable the reader to obtain a clear understanding of the technological concepts described herein, the following processes describe specific steps performed in a specific order. However, one or more of the steps of a particular process may be rearranged and/or omitted while remaining within the contemplated scope of the technology disclosed herein. Moreover, different processes, and/or steps thereof, may be combined, recombined, rearranged, omitted, and/or executed in parallel to create different process flows that are also within the contemplated scope of the technology disclosed herein. Additionally, while the processes below may omit or briefly summarize some of the details of the technologies disclosed herein for clarity, the details described in the paragraphs above may be combined with the process steps described below to get a more complete and comprehensive understanding of these processes and the technologies disclosed herein.

Figure 4:
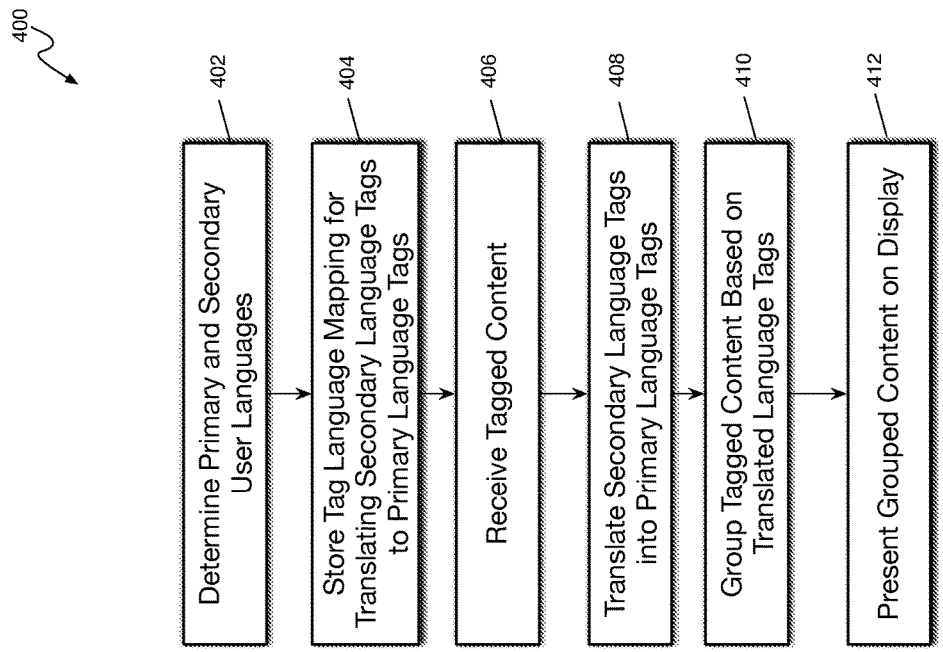
FIG. 4 is a flow diagram of an example process for multi-language grouping of content items based on semantically equivalent topic tags.

FIG. 4 is a flow diagram of an example process 400 for multi-language grouping of content items based on semantically equivalent topic tags. For example, process 400 can be performed by user device 110 to present content items associated with different topic tags in different languages in a single semantically equivalent topic grouping.

At step 402, user device 110 can determine the primary and secondary user languages. For example, user device 110 can determine the primary user language based on the language settings of user device 110. User device 110 can infer the secondary language based on the user's pattern of behavior. In particular, user device 110 can infer one or more secondary languages based on the language of the content consumed by the user over a period of time.

At step 404, user device 110 can store a tag language mapping for translating secondary language tags to primary language tags. For example, user device 110 can send a configuration data request to server device 130. The configuration data request can identify the user's primary language and the user's secondary language or secondary languages. Server device 130 can select a tag language mapping object or file that includes mappings of the topic tags in the user's secondary language to topic tags in the user's primary language and send the selected tag language mapping to user device 110. User device 110 can store the tag language mapping on user device 110 for later use in translating secondary language tags into primary language tags.

At step 406, user device 110 can receive tagged content. For example, user device 110 can request content associated with topic tags to which the user has (e.g., automatically or explicitly) subscribed. Server device 130 can select content items associated with the requested topic tags and send the tagged content items to user device 110. For example, each tagged content item can be tagged with topic tags that describe the content of the corresponding tagged content item.

At step 408, user device 110 can translate secondary language tags associated with the received content items into primary language tags. For example, when a tagged content item is associated with the user's secondary language, the tagged content item will be tagged with topic tags in the user's secondary language. User device 110 can compare the secondary language tags to the tag language mapping to determine the primary language tag that corresponds to (e.g., is mapped to) the secondary language tag associated with the content item. User device 110 can then associate the determined primary language tag with the content item.

At step 410, user device 110 can group the tagged content based on the translated language tags. For example, user device 110 can group the tagged content items based on the primary language tags, including the translated primary language tags, associated with the content items. For example, all content items that are associated with the same primary language topic tag can be grouped together.

At step 412, user device 110 can present the grouped content items on a display of user device 110. For example, user device 110 can present the grouped content items on GUI 300, as described above.

Graphical User Interfaces

This disclosure above describes various Graphical User Interfaces (GUIs) for implementing various features, processes or workflows. These GUIs can be presented on a variety of electronic devices including but not limited to laptop computers, desktop computers, computer terminals, television systems, tablet computers, e-book readers and smart phones. One or more of these electronic devices can include a touch-sensitive surface. The touch-sensitive surface can process multiple simultaneous points of input, including processing data related to the pressure, degree or position of each point of input. Such processing can facilitate gestures with multiple fingers, including pinching and swiping.

When the disclosure refers to "select" or "selecting" user interface elements in a GUI, these terms are understood to include clicking or "hovering" with a mouse or other input device over a user interface element, or touching, tapping or gesturing with one or more fingers or stylus on a user interface element. User interface elements can be virtual buttons, menus, selectors, switches, sliders, scrubbers, knobs, thumbnails, links, icons, radio buttons, checkboxes and any other mechanism for receiving input from, or providing feedback to a user.

Privacy

As described above, one aspect of the present technology is the gathering and use of data available from various sources to automatically subscribe user's to topic of interest and request content items associated with the user's topics of interest. The present disclosure contemplates that in some instances, this gathered data may include personal information data that uniquely identifies or can be used to contact or locate a specific person. Such personal information data can include demographic data, location-based data, telephone numbers, email addresses, social media ID's, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to deliver targeted content that is of greater interest to the user. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of content delivery services, the present technology can be configured to allow users to select to "opt in" or "opt out" of participation in the collection of personal information data during registration for services or anytime thereafter. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users by inferring preferences based on non-personal information data or a bare minimum amount of personal information, such as the content being requested by the device associated with a user, other non-personal information available to the content delivery services, or publicly available information.

Example System Architecture

Figure 5:
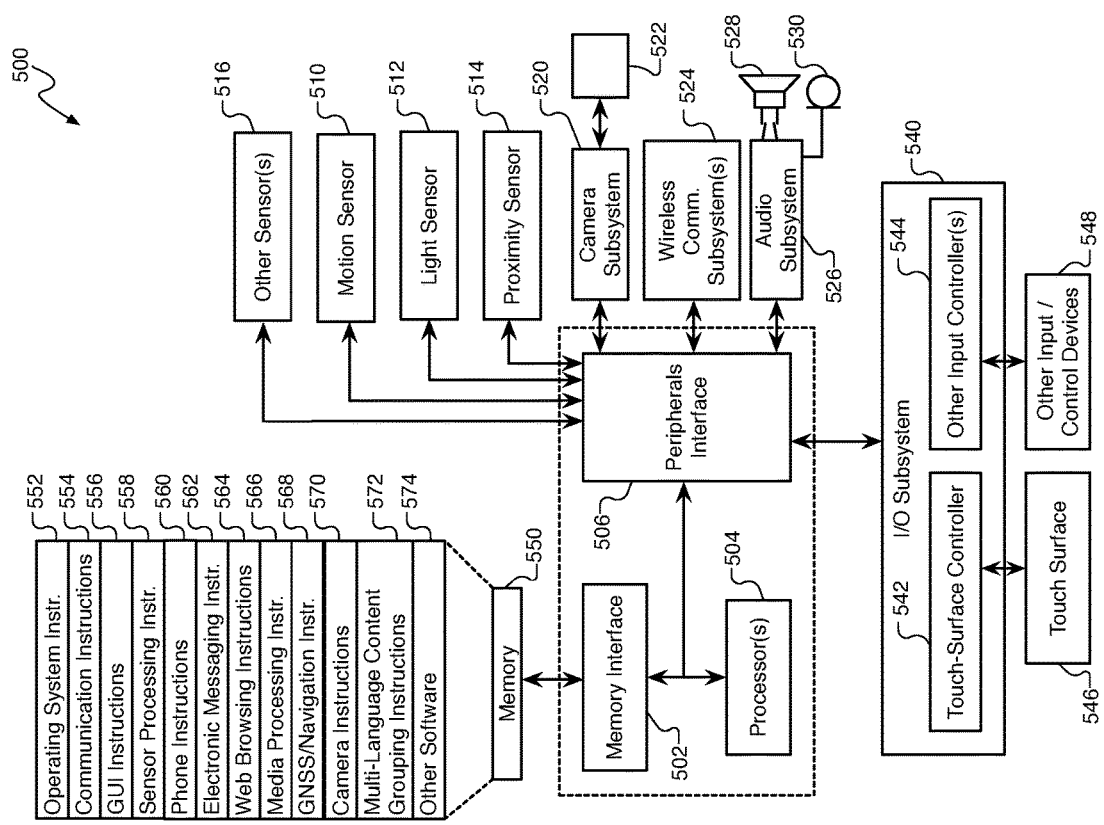
FIG. 5 is a block diagram of an example computing device that can implement the features and processes of FIGS. 1-4.

FIG. 5 is a block diagram of an example computing device 500 that can implement the features and processes of FIGS. 1-4. The computing device 500 can include a memory interface 502, one or more data processors, image processors and/or central processing units 504, and a peripherals interface 506. The memory interface 502, the one or more processors 504 and/or the peripherals interface 506 can be separate components or can be integrated in one or more integrated circuits. The various components in the computing device 500 can be coupled by one or more communication buses or signal lines.

Sensors, devices, and subsystems can be coupled to the peripherals interface 506 to facilitate multiple functionalities. For example, a motion sensor 510, a light sensor 512, and a proximity sensor 514 can be coupled to the peripherals interface 506 to facilitate orientation, lighting, and proximity functions. Other sensors 516 can also be connected to the peripherals interface 506, such as a global navigation satellite system (GNSS) (e.g., GPS receiver), a temperature sensor, a biometric sensor, magnetometer or other sensing device, to facilitate related functionalities.

A camera subsystem 520 and an optical sensor 522, e.g., a charged coupled device (CCD) or a complementary metal-oxide semiconductor (CMOS) optical sensor, can be utilized to facilitate camera functions, such as recording photographs and video clips. The camera subsystem 520 and the optical sensor 522 can be used to collect images of a user to be used during authentication of a user, e.g., by performing facial recognition analysis.

Communication functions can be facilitated through one or more wireless communication subsystems 524, which can include radio frequency receivers and transmitters and/or optical (e.g., infrared) receivers and transmitters. The specific design and implementation of the communication subsystem 524 can depend on the communication network(s) over which the computing device 500 is intended to operate. For example, the computing device 500 can include communication subsystems 524 designed to operate over a GSM network, a GPRS network, an EDGE network, a Wi-Fi or WiMax network, and a Bluetooth™ network. In particular, the wireless communication subsystems 524 can include hosting protocols such that the device 100 can be configured as a base station for other wireless devices.

An audio subsystem 526 can be coupled to a speaker 528 and a microphone 530 to facilitate voice-enabled functions, such as speaker recognition, voice replication, digital recording, and telephony functions. The audio subsystem 526 can be configured to facilitate processing voice commands, voiceprinting and voice authentication, for example.

The I/O subsystem 540 can include a touch-surface controller 542 and/or other input controller(s) 544. The touch-surface controller 542 can be coupled to a touch surface 546. The touch surface 546 and touch-surface controller 542 can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch surface 546.

The other input controller(s) 544 can be coupled to other input/control devices 548, such as one or more buttons, rocker switches, thumb-wheel, infrared port, USB port, and/or a pointer device such as a stylus. The one or more buttons (not shown) can include an up/down button for volume control of the speaker 528 and/or the microphone 530.

In one implementation, a pressing of the button for a first duration can disengage a lock of the touch surface 546; and a pressing of the button for a second duration that is longer than the first duration can turn power to the computing device 500 on or off. Pressing the button for a third duration can activate a voice control, or voice command, module that enables the user to speak commands into the microphone 530 to cause the device to execute the spoken command. The user can customize a functionality of one or more of the buttons. The touch surface 546 can, for example, also be used to implement virtual or soft buttons and/or a keyboard.

In some implementations, the computing device 500 can present recorded audio and/or video files, such as MP3, AAC, and MPEG files. In some implementations, the computing device 500 can include the functionality of an MP3 player, such as an iPod™.

The memory interface 502 can be coupled to memory 550. The memory 550 can include high-speed random-access memory and/or non-volatile memory, such as one or more magnetic disk storage devices, one or more optical storage devices, and/or flash memory (e.g., NAND, NOR). The memory 550 can store an operating system 552, such as Darwin, RTXC, LINUX, UNIX, OS X, WINDOWS, or an embedded operating system such as VxWorks.

The operating system 552 can include instructions for handling basic system services and for performing hardware dependent tasks. In some implementations, the operating system 552 can be a kernel (e.g., UNIX kernel). In some implementations, the operating system 552 can include instructions for performing voice authentication. For example, operating system 552 can implement the multi-language content grouping features as described with reference to FIGS. 1-4.

The memory 550 can also store communication instructions 554 to facilitate communicating with one or more additional devices, one or more computers and/or one or more servers. The memory 550 can include graphical user interface instructions 556 to facilitate graphic user interface processing; sensor processing instructions 558 to facilitate sensor-related processing and functions; phone instructions 560 to facilitate phone-related processes and functions; electronic messaging instructions 562 to facilitate electronic-messaging related processes and functions; web browsing instructions 564 to facilitate web browsing-related processes and functions; media processing instructions 566 to facilitate media processing-related processes and functions; GNSS/Navigation instructions 568 to facilitate GNSS and navigation-related processes and instructions; and/or camera instructions 570 to facilitate camera-related processes and functions.

The memory 550 can store software instructions 572 to facilitate other processes and functions, such as the multi-language content grouping processes and functions as described with reference to FIGS. 1-4.

The memory 550 can also store other software instructions 574, such as web video instructions to facilitate web video-related processes and functions; and/or web shopping instructions to facilitate web shopping-related processes and functions. In some implementations, the media processing instructions 566 are divided into audio processing instructions and video processing instructions to facilitate audio processing-related processes and functions and video processing-related processes and functions, respectively.

Each of the above identified instructions and applications can correspond to a set of instructions for performing one or more functions described above. These instructions need not be implemented as separate software programs, procedures, or modules. The memory 550 can include additional instructions or fewer instructions. Furthermore, various functions of the computing device 500 can be implemented in hardware and/or in software, including in one or more signal processing and/or application specific integrated circuits.

To aid the Patent Office and any readers of any patent issued on this application in interpreting the claims appended hereto, applicants wish to note that they do not intend any of the appended claims or claim elements to invoke 35 U.S.C. 112(f) unless the words "means for" or "step for" are explicitly used in the particular claim.

What is claimed is:

1. A method comprising:
    determining, by a user device, historical content consumption behavior based on content consumed by a user of the user device;
    determining, by the user device, a primary language associated with the user device;
    determining, by the user device, a secondary language associated with the user device,
    wherein at least one of the primary language and the secondary language is determined, by the user device, based on the historical content consumption behavior;
    responsive to determining the primary language and the secondary language associated with the user device:
        obtaining, by the user device without user input, a tag language mapping for translating a first plurality of topic tags associated with the primary language to a second plurality of topic tags associated with the secondary language;
    receiving, by the user device, tagged content items from a server device,
        wherein a first tagged content item, of the tagged content items, is associated with a first tag from the first plurality of topic tags associated with the primary language,
        wherein a second tagged content item, of the tagged content items, is associated with a second tag from the second plurality of topic tags associated with the secondary language;
    based on the tag language mapping: determining, by the user device without user input, that the first tag from the first plurality of topic tags associated with the primary language is semantically equivalent to the second tag from the second plurality of topic tags associated with the secondary language;
    grouping, by the user device without user input, at least the first tagged content item and the second tagged content item into a group of content items based on determining that the first tag is semantically equivalent to the second tag; and
    presenting, by the user device, the group of content items on a display of the user device, wherein the group of content items include the first content item tagged with the first tag associated with the primary language and the second content item tagged with the second tag associated with the secondary language.

2. The method of claim 1, further comprising:
    translating, by the user device, the at least one topic tag in the secondary language associated with the at least one tagged content item to a corresponding topic tag in the primary language based on the tag language mapping; and
    grouping, by the user device, the at least one tagged content item in the secondary language with other content items in the primary language based on the corresponding topic tag in the primary language.

3. The method of claim 1, wherein obtaining the tag language mapping responsive to determining the primary language and the secondary language associated with the user device further comprises:
    sending, by the user device to the server device, a request for the tag language mapping, the request identifying the primary language and the secondary language; and
    receiving, by the user device, the tag language mapping.

4. The method of claim 1, wherein each set of tagged content items having semantically equivalent topic tags are grouped in corresponding groups of semantically equivalent content items.

5. The method of claim 1, further comprising:
    receiving, by the user device, whitelisted tags from the server device, wherein the whitelisted tags is an exclusive collection of topic tags to which the user device may automatically subscribe a user.

6. The method of claim 5, further comprising:
    determining, by the user device, that the user of the user device has consumed content associated with a particular topic tag;
    determining, by the user device, that the user is not currently subscribed to receive content associated with the particular topic tag;
    determining, by the user device, the particular topic tag is included in the whitelisted tags; and
    in response to determining the particular topic tag is included in the whitelisted tags, automatically subscribing, by the user device, the user to receive content associated with the particular topic tag.

7. The method of claim 5, further comprising:
    determining, by the user device, that the user of the user device has consumed content associated with a particular topic tag;
    determining, by the user device, that the user is not currently subscribed to receive content associated with the particular topic tag;
    determining, by the user device, the particular topic tag is not included in the whitelisted tags; and
    in response to determining the particular topic tag is not included in the whitelisted tags, preventing the user device from automatically subscribing the user to receive content associated with the particular topic tag.

8. A non-transitory computer readable medium including one or more sequences of instructions that, when executed by one or more processors, cause the processors to perform operations comprising:

determining, by a user device, historical content consumption behavior based on content consumed by a user of the user device;
determining, by the user device, a primary language associated with the user device;
determining, by the user device, a secondary language associated with the user device,
wherein at least one of the primary language and the secondary language is determined, by the user device, based on the historical content consumption behavior;
responsive to determining the primary language and the secondary language associated with the user device:
obtaining, by the user device without user input, a tag language mapping for translating a first plurality of topic tags associated with the primary language to a second plurality of topic tags associated with the secondary language;
receiving, by the user device, tagged content items from a server device,
wherein a first tagged content item, of the tagged content items, is associated with a first tag from the first plurality of topic tags associated with the primary language,
wherein a second tagged content item, of the tagged content items, is associated with a second tag from the second plurality of topic tags associated with the secondary language;
based on the tag language mapping: determining, by the user device without user input, that the first tag from the first plurality of topic tags associated with the primary language is semantically equivalent to the second tag from the second plurality of topic tags associated with the secondary language;
grouping, by the user device without user input, at least the first tagged content item and the second tagged content item into a group of content items based on determining that the first tag is semantically equivalent to the second tag; and
presenting, by the user device, the group of content items on a display of the user device, wherein the group of content items include the first content item tagged with the first tag associated with the primary language and the second content item tagged with the second tag associated with the secondary language.

9. The non-transitory computer readable medium of claim 8, wherein the instructions cause the processors to perform operations comprising:
translating, by the user device, the at least one topic tag in the secondary language associated with the at least one tagged content item to a corresponding topic tag in the primary language based on the tag language mapping; and
grouping, by the user device, the at least one tagged content item in the secondary language with other content items in the primary language based on the corresponding topic tag in the primary language.

10. The non-transitory computer readable medium of claim 8, wherein obtaining the tag language mapping responsive to determine the primary language and the secondary language associated with the user device further comprises:
sending, by the user device to the server device, a request for the tag language mapping, the request identifying the primary language and the secondary language; and
receiving, by the user device, the tag language mapping.

11. The non-transitory computer readable medium of claim 8, wherein each set of tagged content items having semantically equivalent topic tags are grouped in corresponding groups of semantically equivalent content items.

12. The non-transitory computer readable medium of claim 8, wherein the instructions cause the processors to perform operations comprising:
receiving, by the user device, whitelisted tags from the server device, wherein the whitelisted tags is an exclusive collection of topic tags to which the user device may automatically subscribe a user.

13. The non-transitory computer readable medium of claim 12, wherein the instructions cause the processors to perform operations comprising:
determining, by the user device, that the user of the user device has consumed content associated with a particular topic tag;
determining, by the user device, that the user is not currently subscribed to receive content associated with the particular topic tag;
determining, by the user device, the particular topic tag is included in the whitelisted tags; and
in response to determining the particular topic tag is included in the whitelisted tags, automatically subscribing, by the user device, the user to receive content associated with the particular topic tag.

14. The non-transitory computer readable medium of claim 12, wherein the instructions cause the processors to perform operations comprising:
determining, by the user device, that the user of the user device has consumed content associated with a particular topic tag;
determining, by the user device, that the user is not currently subscribed to receive content associated with the particular topic tag;
determining, by the user device, the particular topic tag is not included in the whitelisted tags; and
in response to determining the particular topic tag is not included in the whitelisted tags, preventing the user device from automatically subscribing the user to receive content associated with the particular topic tag.

15. A system comprising:
one or more processors; and
a non-transitory computer readable medium including one or more sequences of instructions that, when executed by the one or more processors, cause the processors to perform operations comprising:
determining, by a user device, historical content consumption behavior based on content consumed by a user of the user device;
determining, by the user device, a primary language associated with the user device;
determining, by the user device, a secondary language associated with the user device,
wherein at least one of the primary language and the secondary language is determined, by the user device, based on the historical content consumption behavior;
responsive to determining the primary language and the secondary language associated with the user device:
obtaining, by the user device without user input, a tag language mapping for translating a first plurality of topic tags associated with the primary language to a second plurality of topic tags associated with the secondary language;

receiving, by the user device, tagged content items from a server device,
  wherein a first tagged content item, of the tagged content items, is associated with a first tag from the first plurality of topic tags associated with the primary language,
  wherein a second tagged content item, of the tagged content items, is associated with a second tag from the second plurality of topic tags associated with the secondary language;
based on the tag language mapping: determining, by the user device without user input, that the first tag from the first plurality of topic tags associated with the primary language is semantically equivalent to the second tag from the second plurality of topic tags associated with the secondary language;
grouping, by the user device without user input, at least the first tagged content item and the second tagged content item into a group of content items based on determining that the first tag is semantically equivalent to the second tag; and
presenting, by the user device, the group of content items on a display of the user device, wherein the group of content items include the first content item tagged with the first tag associated with the primary language and the second content item tagged with the second tag associated with the secondary language.

16. The system of claim 15, wherein the instructions cause the processors to perform operations comprising:
  translating, by the user device, the at least one topic tag in the secondary language associated with the at least one tagged content item to a corresponding topic tag in the primary language based on the tag language mapping; and
  grouping, by the user device, the at least one tagged content item in the secondary language with other content items in the primary language based on the corresponding topic tag in the primary language.

17. The system of claim 15, wherein obtaining the tag language mapping responsive to determining the primary language and the secondary language associated with the user device further comprises:
  sending, by the user device to the server device, a request to the server device for the tag language mapping, the request identifying the primary language and the secondary language; and
  receiving, by the user device, the tag language mapping.

18. The system of claim 15, wherein each set of tagged content items having semantically equivalent topic tags are grouped in corresponding groups of semantically equivalent content items.

19. The system of claim 15, wherein the instructions cause the processors to perform operations comprising:
  receiving, by the user device, whitelisted tags from the server device, wherein the whitelisted tags is an exclusive collection of topic tags to which the user device may automatically subscribe a user.

20. The system of claim 19, wherein the instructions cause the processors to perform operations comprising:
  determining, by the user device, that the user of the user device has consumed content associated with a particular topic tag;
  determining, by the user device, that the user is not currently subscribed to receive content associated with the particular topic tag;
  determining, by the user device, the particular topic tag is included in the whitelisted tags; and
  in response to determining the particular topic tag is included in the whitelisted tags, automatically subscribing, by the user device, the user to receive content associated with the particular topic tag.

21. The system of claim 19, wherein the instructions cause the processors to perform operations comprising:
  determining, by the user device, that the user of the user device has consumed content associated with a particular topic tag;
  determining, by the user device, that the user is not currently subscribed to receive content associated with the particular topic tag;
  determining, by the user device, the particular topic tag is not included in the whitelisted tags; and
  in response to determining the particular topic tag is not included in the whitelisted tags, preventing the user device from automatically subscribing the user to receive content associated with the particular topic tag.

* * * * *